(12) United States Patent
Fellinger et al.

(10) Patent No.: US 12,098,542 B2
(45) Date of Patent: Sep. 24, 2024

(54) ADHESIVE MIXTURE USED FOR THE PURPOSE OF CREATING WATER ACTIVATED STICK ON INSULATION

(71) Applicant: JOHNS MANVILLE, Denver, CO (US)

(72) Inventors: Thomas John Fellinger, Littleton, CO (US); Brennan Michael Hall, Arvada, CO (US)

(73) Assignee: Johns Manville, Denver, CO (US)

( * ) Notice: Subject to any disclaimer, the term of this patent is extended or adjusted under 35 U.S.C. 154(b) by 611 days.

(21) Appl. No.: 16/773,674

(22) Filed: Jan. 27, 2020

(65) Prior Publication Data
US 2021/0340758 A1    Nov. 4, 2021

(51) Int. Cl.
| | |
|---|---|
| *E04B 1/74* | (2006.01) |
| *C08K 5/17* | (2006.01) |
| *C08K 5/21* | (2006.01) |
| *C08L 3/02* | (2006.01) |
| *C08L 25/08* | (2006.01) |
| *C08L 29/04* | (2006.01) |
| *C08L 33/02* | (2006.01) |
| *C09J 7/32* | (2018.01) |
| *C09J 103/02* | (2006.01) |
| *C09J 125/08* | (2006.01) |
| *C09J 129/04* | (2006.01) |
| *C09J 133/02* | (2006.01) |

(52) U.S. Cl.
CPC ............ *E04B 1/74* (2013.01); *C08K 5/17* (2013.01); *C08K 5/21* (2013.01); *C08L 3/02* (2013.01); *C09J 7/32* (2018.01); *C09J 103/02* (2013.01); *C09J 125/08* (2013.01); *C09J 129/04* (2013.01); *C09J 133/02* (2013.01); C08L 25/08 (2013.01); C09J 2203/346 (2020.08); C09J 2301/204 (2020.08); C09J 2301/408 (2020.08); C09J 2403/00 (2013.01); C09J 2425/00 (2013.01); C09J 2429/00 (2013.01); C09J 2433/00 (2013.01)

(58) Field of Classification Search
None
See application file for complete search history.

(56) References Cited

U.S. PATENT DOCUMENTS

| | | | |
|---|---|---|---|
| 9,175,197 B2 * | 11/2015 | Kanemura | C08F 297/026 |
| 9,180,645 B2 | 11/2015 | Fellinger | |
| 2008/0292880 A1 * | 11/2008 | Hansen | C09J 7/29 427/208.4 |
| 2009/0156721 A1 * | 6/2009 | Lee | C09J 133/08 524/211 |
| 2018/0208806 A1 * | 7/2018 | Fellinger | B32B 17/02 |

* cited by examiner

*Primary Examiner* — Frank D Ducheneaux
(74) *Attorney, Agent, or Firm* — Robert D. Touslee

(57) ABSTRACT

A self-stick insulation includes an insulation product and an adhesive coating applied to a major surface of the insulation product. The adhesive coating includes between about 5-15% by weight of the adhesive coating of at least one of polystyrene-maleic anhydride (SMA) and polyacrylic acid (PAA), between about 1 and 8% by weight of the adhesive coating of an alcohol amine, between about 25 and 50% by weight of the adhesive coating of a polyvinyl alcohol, and between about 20 and 40% by weight of the adhesive coating of a starch paste. The adhesive is activated with the application of liquid water.

20 Claims, 4 Drawing Sheets

ADHESIVE MIXTURE USED FOR THE PURPOSE OF CREATING WATER ACTIVATED STICK ON INSULATION

BACKGROUND OF THE INVENTION

Pre-formed insulation products (batts, blankets, boards, etc.) are applied to various structures and equipment using a variety of fastening techniques. For example, in wood framed wall applications, faced batt insulation are typically pressed into cavities and stapled in place to perimeter framing members of each cavity via a stapling flange on the facing. Similarly, un-faced batt insulation used for framed walls (wood or steel stud) is typically held in place with a friction fit and may be later covered with wallboard to prevent fall out. For crawl spaces, lightning rods or other mechanical fastening devices are typically used to hold the insulation in place. Foam boards are generally glued to framing members and/or fastened with nails or other fasteners. Application to other surfaces, such as HVAC equipment, ducts, and appliances, may be accomplished using adhesives, fastening clips, or a combination of the two. The adhesives are generally applied to the insulation right before installation. Typical adhesives include solvent-based products, hot melts, pressure sensitive adhesives, IR activated adhesives, water-based adhesives, VOC based adhesives, and the like. Unfortunately, these adhesives may be expensive and/or require the use of personal protective equipment (PPE) to protect workers from burns, volatile organic compounds (VOC), etc. Moreover, existing self-stick adhesive mixtures have demonstrated impractically high tack times in sheet metal applications.

BRIEF SUMMARY OF THE INVENTION

Embodiments of the invention are directed to an improved tack re-wettable adhesive mixture that has been developed primarily for applying insulation products to various substrates after wetting a pre-applied dried surface coating of adhesive on the insulation material with water (or other liquid). For example, water may be misted (such as by spraying) and/or rolled onto a dried adhesive coating and/or the intended application surface (such as a section of sheet metal moving through a coil line). After water application, the adhesive coating rehydrates in about 2-5 seconds and develops sufficient tack to allow the insulation to be held in place on the intended application surface.

In one embodiment, a self-stick insulation is provided. The insulation may include an insulation product and an adhesive coating applied to a major surface of the insulation product. The adhesive coating may include between about 5-15% by weight of the adhesive coating of at least one of polystyrene-maleic anhydride (SMA) and polyacrylic acid (PAA) and between about 1 and 8% by weight of the adhesive coating of an alcohol amine. The adhesive coating may also include between about 25 and 50% by weight of the adhesive coating of a polyvinyl alcohol and between about 20 and 40% by weight of the adhesive coating of a starch paste. The adhesive may activated with the application of liquid water.

In one embodiment, a re-wettable adhesive mixture is provided. The adhesive mixture may include between about 5-15% by weight of the adhesive coating of at least one of polystyrene-maleic anhydride (SMA) and polyacrylic acid (PAA) and between about 1 and 8% by weight of the adhesive coating of an alcohol amine. The adhesive mixture may also include between about 30 and 60% by weight of the adhesive coating of a polyvinyl alcohol and between about 20 and 40% by weight of the adhesive coating of a starch paste. The adhesive may be activated with the application of liquid water.

In another embodiment, a method of making a self-stick insulation is provided. The method may include providing a piece of insulation product and applying a water-activated adhesive coating to a surface of the insulation product. The water-activated adhesive coating may include between about 5-15% by weight of the adhesive coating of at least one of polystyrene-maleic anhydride (SMA) and polyacrylic acid (PAA) and between about 1 and 8% by weight of the adhesive coating of an alcohol amine. The water-activated adhesive coating may also include between about 25 and 50% by weight of the adhesive coating of a polyvinyl alcohol and between about 20 and 40% by weight of the adhesive coating of a starch paste. The method may also include drying the water-activated adhesive coating to evaporate the water to form a dry adhesive coating layer on the surface.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
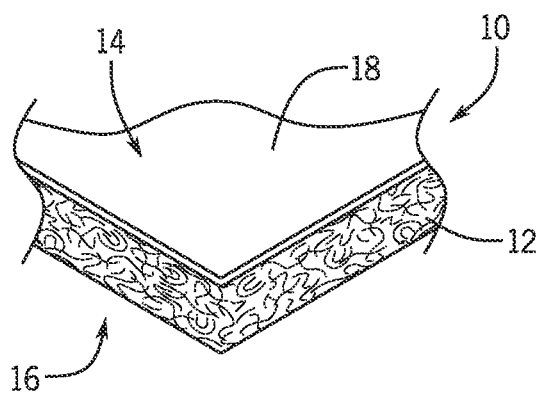
FIG. 1 is a perspective view of an embodiment of an insulation product.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The embodiments discussed below include starch-based adhesive formulations that may be applied to an insulation product (or other material) to make the product "self-stick." The term self-stick refers to the insulation product's ability to bond or adhere to an object without the need to apply an adhesive or glue immediately before pressing the insulation product on the object for which bonding is intended. The term self-stick does not imply that an adhesive is not used to adhere the insulation product to a surface, but rather, that a user need not apply the adhesive immediately before installation. Rather, the adhesive may be pre-applied and allowed to dry. Then the adhesive may be re-wet or re-activated at the time of installation by the application of water to the adhesive. Because the user is not required to apply the adhesive immediately before installation, installation time is reduced, the need to utilize expensive clips, staples, or other fasteners is reduces or eliminated, the user is less exposed to various chemicals (e.g., VOCs), and is protected from potential burns (e.g., hot melt adhesives). Additionally, the starch-based adhesives are quicker and easier to apply that other adhesives.

The starch-based adhesives of the present disclosure provide numerous benefits over existing adhesive formulations. Such starch-based adhesives provide improved tack times, particularly when compared to existing adhesives that are used to adhere to ductwork and/or other sheet metal applications. The starch-based adhesives of the present disclosure provide excellent bond strength under various climatic conditions, including high humidity climates. These adhesives can be applied with roll coating technology, with a pump and spray nozzle system, and/or by dripping or drizzling the adhesive onto the insulation (or other product) surface. Such adhesives are water soluble, which makes clean up easy. Additionally, these adhesives adhere well to various substrates (metal, powder-coated metal, wood, concrete, etc.) and have a reasonably short dry time.

The starch-based adhesive embodiments described herein are generally applied to products that are referred to as insulation products, however embodiments are not so limited as the starch-based adhesives may be used to applied non-insulation products as well. Insulation products may include fibrous insulation (such as blankets) and/or insulation boards. These terms are used merely for convenience in describing the embodiments and are not meant to limit the invention to any one type of insulation product unless indicated. These terms may include any insulation type products, which could be made of various fibers, foams, and the like. Common types of insulation products include fiberglass, mineral wool, slag wool, rock wool, foam or other insulation boards, and the like, which may include facers. The disclosure also uses the terms "re-adherable" or "rebondable" to describe how liquid water (i.e., non-gaseous or vapor water) may be applied to the dried adhesive to activate the adhesive for bonding, adhering, or coupling with another object.

In operation, the dry adhesive film or coating activates in the presence of liquid water and not in the presence of humidity. For example, the thin film or coating of the dry adhesive on the insulation or flange may be moistened with a fine water mist with a sprayer, sponge, and the like, and allowed a few seconds to change phase from a solid to a gel or viscous liquid. The insulation product can then be placed and pressed in position, held for several seconds, and released. After the moistened adhesive gel or liquid dries, a bond forms between the insulation product and the application surface that holds the insulation product in place. In some embodiments, a surface (e.g., a wall, duct, etc.) intended for the insulation product may be wet with a sponge or sprayer and then the insulation product positioned and pressed against the surface to adhere the insulation to the surface.

In some embodiments, the adhesive may be applied to a surface of the insulation product by spraying, dripping, rolling, and/or otherwise applying the adhesive onto the surface and/or onto a flange of the insulation product via a spray header and pump assembly. The application of the adhesive may occur during an insulation product manufacturing process or by a secondary fabricator. The applied adhesive forms a thin film or coating of adhesive on the insulation surface. In another embodiment, the adhesive can be applied using an adhesive-filled trough and by pulling the insulation mat through the trough at a controlled speed such that a film coating or layer forms on the insulation product's surface.

The wet adhesive film, layer, or coating may then be dried via a curing oven, infrared oven, some other heat source, and/or air dried before the insulation product is further processed and packaged, such as by rolling the insulation product for shipment to another facility. In some embodiments, the dry adhesive coated insulation product may then be shipped to in weather tight packaging to avoid exposure to liquid water and thus reactivation of the adhesive during shipment and/or storage.

In some embodiments, a facer material may be coupled to the insulation product using the starch-based water-activated adhesive coating and/or other adhesive material. The facer material may be a paperboard or cardboard material (e.g., kraft paper), foil, scrim, polymer material, and the like, or any combination thereof (e.g., foil, scrim, kraft (FSK)). In some embodiments, the insulation product may be transported to a separate facility after the adhesive is applied and dried. The separate facility may then bond the facer material to the insulation product by reactivating the adhesive with liquid water. In some embodiments, the insulation product may be precut into desired shapes before shipment to facilitate future installation.

During installation, installers wet the dry adhesive layer or coating with liquid water and apply the insulation product to one or more objects. For example, the installers simply need a water application device, such as a sprayer, roller, sponge, etc. to apply liquid water to reactivate the adhesive. The water may be applied directly to the adhesive coating and/or may be applied to a surface of the object on which the adhesive-coated insulation product is to be applied. The installers may therefore avoid handling additional glues and/or adhesives while installing the insulation product and the associated exposure to volatile organic compounds (VOCs).

The adhesive coating enables the insulation product to couple to a variety of objects with or without the use of clips, pins, staples, etc. These objects may include metal (including powder-coated metal) surfaces such as ducts, pipes, machine components (e.g., HVAC systems, cars). In some embodiments, the insulation product may be installed between studs or joints (e.g., metal, wood) of a building or home. In another embodiment, the insulation product may be adhered to garage door panels (e.g., plastic, wood, metal) to insulate a home or a building's garage.

When the dry adhesive layer or coating is wetted and pressed against an object, the adhesive may have a "working time" or tack time in which the installer is able to adjust the position of the insulation product relative to the object. In other words, the adhesive may have a period of time before it completely or significantly sets and the insulation product is firmly held in place. The adhesive's working time allows the installer to move or shift, or even remove, the insulation product in case of misalignment, improper installation, and the like. For example, the working time or tack time may be less than 30 seconds. In another embodiment, the installer may have 15 seconds or less, 10 seconds or less, 5 seconds or less before the adhesive sets and adheres to the object. In still another embodiment, the adhesive may become tacky within 2-5 seconds to the point that the insulation product may be applied to an object's surface and remain in place.

As explained above, the adhesive reactivates when liquid water is applied. In some embodiments, the adhesive may become sufficiently tacky upon an application of as little as 1%, 2%, 3%, 4%, 5% liquid water by weight of the insulation product. In another embodiment, the adhesive may become sufficiently tacky upon an application of water between about 5% and 15% by weight of the insulation product. This range allows the adhesive to become tacky without becoming overly fluid and/or without saturating the insulation product with water and thereby increasing the weight that must be supported by the adhesive and/or the drying time. If too much water is applied, the tack time may be increased. As described herein, the water may be applied by spraying a fine mist over the dry adhesive layer, film, or coating, or by applying the water with a sponge, roller, and/or other application means. Although the adhesive is reactivated upon the application of liquid water, the adhesive may not reactivate even when subjected to high humidity and high heat conditions. For example, the adhesive may remain in the nonadherable or nonbondable state even when subjected to a relative humidity as high as 90% or more at 100 degrees Fahrenheit. As such, the insulation product may be shipped to and installed in areas of high heat and humidity without negatively affecting the insulation product's performance.

In some embodiments, the adhesive may be applied to the insulation product in a continuous and/or uniform manner having a consistent coating weight across at least a substantial portion of the surface area of the insulation product. In other embodiments, the adhesive may be applied to the insulation product so as to form a non-continuous and/or non-uniform layer, film, or coating atop the insulation product's surface. For example, the adhesive material may be applied to the insulation product's surface in a patterned arrangement (e.g., S-pattern, parallel or crossing lines, honeycomb pattern, dot pattern, splat pattern, and the like). In some embodiments, a non-uniform coating enables less adhesive to be used while still enabling the insulation product to adhere to the surface of an object. Once applied and dried, the adhesive coating may comprise between 1% and 8% by weight of the insulation product. In other embodiments, the dry adhesive layer, film, or coating may comprise between 3%-6%, 1%-4%, 3%-4% by weight of the insulation product. In still other embodiments, the dry adhesive coating may be applied to an insulation product with a coating weight of between 1-6 grams per square foot, 2-4 grams per square foot, 3-4 grams per square foot, etc. These small amounts of adhesive coating on the insulation product enable rapid reactivation and bonding while reducing costs and providing sufficient support for the insulation product.

The starch-based adhesive of the present disclosure is formed by combining polystyrene-maleic anhydride (SMA) and/or polyacrylic acid (PAA), an alcohol amine, a polyvinyl alcohol, a starch paste, and water to form an adhesive mixture. In some embodiments, the adhesive mixture may also include aqueous ammonia and/or urea. It is this mixture that is then sprayed, roll-coated, and/or otherwise applied onto the insulation product. The polystyrene-maleic anhydride (SMA) and/or polyacrylic acid (PAA), solid portion of the alcohol amine, sold portion of the polyvinyl alcohol, and solid portion of the starch paste (as well as any urea and/or solid portion of aqueous ammonia present within the mixture) may be referred to as solids in this adhesive mixture. In some embodiments, the percentage of solids in the adhesive mixture is between 20-45%, oftentimes between about 30-40%, with water making up the remainder of the mixture. The high percentage of solids in the adhesive mixture facilitates a rapid drying of the adhesive (i.e., reduced tack or set time) by reducing the amount of water that needs to evaporate. The combination of these materials in the proportions disclosed below reduce flammability, smoking, and corrosion of the adhesive enabling the use of the adhesive in the applications discussed above and below.

In operation, the components of the adhesive mixture serve specific purposes that either facilitate formation of the adhesive and/or give the adhesive specific properties. For example, the alcohol amine serves as a pH stabilizer, fire retardant, and a corrosion inhibitor. The alcohol amine component of the adhesive mixture may include monoethanolamine (MEA), diethanolamine (DEA), triethanolamine (TEOA), and/or triethylamine (TEA). In some embodiments, the percentage of the alcohol amine component of the adhesive mixture may be 1-15% (more commonly between about 3-10%) by weight of the solids in the adhesive mixture. The alcohol amine component of the adhesive mixture may be present in the amount of between about 1 and 8% (more commonly between about 1-4%) by total weight of the adhesive mixture. It has been found that too much alcohol amine in the adhesive enables moisture in the air to activate the adhesive, while too little reduces the fire resistance of the adhesive. Accordingly, the preferred percentage of alcohol amine should be 5-10% by weight of the solids in the adhesive mixture to reduce and/or block moisture in the air from unintentional activation of the adhesive while still providing fire resistance. In some embodiments, the alcohol amine enables the adhesive coating to pass the E84 fire test.

The polyvinyl alcohol component of the adhesive mixture provides the adhesive with all or a majority of its tackiness/stickiness. In some embodiments, the polyvinyl alcohol may be between about 15 and 35% solids. The polyvinyl alcohol may make up between about 25-50% (more commonly between about 30-40%) by weight of the solids in the adhesive mixture to provide an adequate amount of tackiness/stickiness. The polyvinyl alcohol may make up about 30-50% (commonly between about 35-45%) by total weight of the adhesive mixture. The polyvinyl alcohol may also increase the flexibility of the adhesive. In other words, the polyvinyl alcohol may reduce and/or prevent the adhesive from becoming to brittle and/or cracking before and/or after installation. Polyvinyl alcohol may also assist in resisting activation of the adhesive from moisture in the air.

Another major portion of the adhesive mixture may include at least one of polyacrylic acid (PAA), styrene maleic anhydride (SMA), and/or styrene maleic anhydride copolymer (SMAc). This portion of the adhesive mixture may be 15-40% (commonly between about 20-30%) by weight of the solids in the adhesive mixture in order to reduce the viscosity of the mixture to ensure adequate mixing of all the components of the adhesive mixture. The PAA, SMA, and/or SMAc may make up about 1-15% (commonly between about 5-15% or more commonly between about 5-10%) by total weight of the adhesive mixture. In embodiments that contain SMA, SMAc, and/or PAA, the SMA, SMAc, and/or PAA may contribute to the overall tackiness/stickiness of the adhesive.

In some embodiments, the SMA and/or PAA, may have a relative low molecular weight in order to lower the viscosity. It has been found that too high molecular weight of SMA and PAA increases the viscosity, while too low of a molecular weight reduces the tackiness and adhesion. The molecular weight of SMA and PAA may be 500-5,000 (g/mol).

In some embodiments, SMA may be pre-hydrolyzed in water at elevated temperature to be water soluble. Ammonia may be added during the hydrolysis reaction. For example, ammonia (such as aqueous ammonia having between about 20-40% solids) may operate as a hydrolysis accelerator in the reaction that forms the adhesive mixture. In embodiments that use ammonia, the ammonia may be about 1-5%, more commonly 1-3% by weight of the adhesive mixture.

The starch paste may be added to help the adhesive mixture have a quicker tack time, particularly in applications in which the adhesive mixture is used to secure an insulation product with a sheet metal surface, such as in ductwork applications. In some embodiments, the starch paste may be a liquid solution, such as an aqueous solution containing between 20-40% (commonly between 25-35% and more commonly about 30%) solids, with the remaining portion being water. In some embodiments, the starch paste may include only a combination of starch and water, while in other embodiments, one or more additional materials may be included. As just one example, some embodiments of starch paste may include a mold inhibitor in a quantity of between about 1 and 5% by weight of the starch paste. In some embodiments, the starch may be corn starch and/or modified cornstarch, however other sources of starch may be utilized in some embodiments. The starch paste may have a viscosity of between about 2,000 and 2,200 centipoise, oftentimes being about 2,100 centipoise. The starch paste may have pH of between about 3.7 and 4.7, with a pH of about 4.2 being common. The starch paste may have a specific gravity of between about 1.0 and 1.2, with a specific gravity of 1.1 being common. In some embodiments, the starch paste may be substantially soluble in water. As just one particular example the starch paste may be SEALMASTER® P30L Modified Starch Paste that is available from Grain Processing Corporation. The solids of the starch paste may be present in an amount of between about 20-30% by weight of the solids in the adhesive mixture. The starch paste may make up between about 20-40% by total weight of the adhesive mixture, more commonly between about 25-35%.

Oftentimes, the quantity of starch paste and polyvinyl alcohol will exceed 60% by total weight of the adhesive mixture. In some embodiments, starch paste and polyvinyl alcohol may account for over 70% of the total weight of the adhesive mixture, with amounts between 70% and 80% being common.

In some embodiments, the adhesive mixture may include a urea compound, such as carbamide, carbonyldiamide, and/or carbmidic acid. Typically, the urea is provided in a dry form. Urea may aid the adhesive in adhering to certain surfaces, such as concrete. The urea may be present in an amount of between about 5-15% by weight of the solids of the adhesive mixture. In some embodiments, the urea may make up between about 1-5% of the total weight of the adhesive mixture.

It will be appreciated that in some embodiments, one or more additional materials, such as additives and/or fillers may be incorporated into the adhesive mixture to provide and/or enhance properties of the adhesive mixture (flame resistance, mold resistance, etc.) and/or to adjust a viscosity of the adhesive mixture.

In some embodiments, the pH of the adhesive mixture may be adjusted to an optimal pH. It has been found that if adhesive mixture has a low pH corrosion may increase and that if the pH is to high the adhesion/tackiness may decrease. An optimal pH for the adhesive mixture may therefore be between 5.5-7.5 pH.

As explained above, the adhesive may couple an insulation product to a variety of surfaces. Below are various tables illustrating tests conducted with the adhesive material under various conditions and with different materials. Table 1 reflects the test results of the adhesive using the standards of ASTM C 916 (Standard Specification for Adhesives for Duct Thermal Insulation).

TABLE 1

| Required Testing | Material | Requirement/ Allowable | Status |
| --- | --- | --- | --- |
| D 903 Bonding Strength (Ambient) | Galvanized Steel/ Canvas/SSA | 0.5 lb/in. | Pass |
| D 903 Bonding Strength (24 hrs. @ 95% RH) | Galvanized Steel/ Canvas/SSA | 0.5 lb/in. | Pass |
| D 903 Bonding Strength (7 days @ 160° F.) | Galvanized Steel/ Canvas/SSA | 0.5 lb/in. | Pass |
| C 916/D1151 Bonding Retention (90 days @ 160° F.) | Galvanized Steel/ JM Micromat/ SSA | ≤75% fiber bonding | Pass |
| E 84 Surface Burning Characteristics | Cement Board/ SSA | 25/50 Flame/Smoke | Pass |
| C 916 Edge Burning | 1" JM Micromat/SSA | No residual flame >3 sec. | Pass |
| C916 Edge Burning | 1" JM Tuf-Glas/SSA | No residual flame >3 sec. | Pass |
| C 916 Storage Stability | SSA | No property change after 6 months | In Process |

| Additional Property Testing | Material | Test Result | Status |
| --- | --- | --- | --- |
| Solid Content | SSA | 40% | NA |
| Viscosity | SSA | 1418 cpoise @ 22° C. | NA |
| Dry Reactivation | SSA w/Micromat, Tuf-Glas & Duracore | ~6-10 sec. | NA |
| Repositioning Time | SSA w/Micromat, Tuf-Glas & Duracore | ~10-20 sec. | NA |
| Bonding Time | SSA w/Micromat, Tuf-Glas & Duracore | Partial - 20-60 sec. Full - 24 hrs. | NA |
| Color | SSA | Amber | NA |
| Odor | SSA | Mild sweet/sour smell | NA |

Table 2 reflects the test results of the adhesive using the standards of ASTM C 1071 (Standard Specification for Fibrous Glass Duct Lining Insulation).

TABLE 2

| Required Testing | Material | Requirement/Allowable | Status |
|---|---|---|---|
| C 655 Corrosiveness 95% RH, 120 F., 96 hrs. | Carbon Steel/Tuf-Glas | No corrosion > control material | Pass |
| C 1104 Water Vapor Sorption | Tuf-Glas/SSA | ≤3% by wt. | Pass |
| C 1104 Water Vapor Sorption | Micromat/SSA | ≤3% by wt. | Pass |
| C 1104 Water Vapor Sorption | Duracore/SSA | ≤3% by wt. | Pass |
| C 1338 Fungi Resistance | Micromat/SSA | No fungal growth | Pass |
| C 411 Temperature Resistance, 250 F. | Duracore/SSA | No flame, smoke, glowing, delamination, etc. | Pass |
| UL 181 Erosion Resistance | Micromat/SSA | No material loss at 2500 fpm air velocity for 6 hrs. | Pass |
| C 1304 Odor Emission 150 F., 30 min. | Micromat/SSA | Not objectionable | Pass |
| E 84 Surface Burning Characteristics | Micromat/SSA | ≤25/50 Flame/Smoke | Pass |
| E 84 Surface Burning Characteristics | Tuf-Glas/SSA | ≤25/50 Flame/Smoke | Pass |
| Apparent Thermal Conductivity | Not tested - adhesive has no influence | NA | NA |
| Sound Absorption Coefficients | Not tested - adhesive has no influence | NA | NA |
| G 22 Bacteria Resistance | Micromat/SSA | No bacterial growth | Pass |
| NFPA 259 Combustion Characteristics | Tuf-Glas/SSA | ≤3500 Btu/lb. | Pass |
| NFPA 259 Combustion Characteristics | Micromat/SSA | ≤3500 Btu/lb. | Pass |

| Additional Testing | Material | Requirement/Allowable | Status |
|---|---|---|---|
| C 665 Corrosiveness 95% RH, 120 F., 96 hrs. | Galvanized Steel/Tuf-Glas | No corrosion > control material | Pass |
| C 665 Corrosiveness 95% RH, 120 F., 96 hrs. | Galvanized Steel/Micromat | No corrosion > control material | Pass |
| C 665 Corrosiveness 95% RH, 120 F., 96 hrs. | Galvanized Steel/Duracore | No corrosion > control material | Pass |
| C 1617 Accelerated Corrosiveness | Carbon Steel/Tuf-Glas | No corrosion > control material | Pass |

Table 3 reflects the test results of the adhesive using the standards of ASTM C 1290 (Standard Specification for Flexible Fibrous Glass Blanket Insulation Used to Externally Insulate HVAC Ducts).

TABLE 3

| Required Testing | Material | Requirement/Allowable | Status |
|---|---|---|---|
| C 655 Corrosiveness 95% RH, 120 F., 96 hrs. | Carbon Steel/Tuf-Glas | No corrosion > control material | Pass |
| C 1104 Water Vapor Sorption | Tuf-Glas/SSA | ≤5% by wt. | Pass |
| C 1104 Water Vapor Sorption | Micromat/SSA | ≤5% by wt. | Pass |
| C 1104 Water Vapor Sorption | Duracore/SSA | ≤5% by wt. | Pass |
| C 1338 Fungi Resistance | Micromat/SSA | No fungal growth | Pass |
| C 411 Hot Surface Performance, 250 F. | Duracore/SSA | No flame, smoke, glowing, delamination, etc. | Pass |
| C 1304 Odor Emission 150 F., 30 min. | Micromat/SSA | Not objectionable | Pass |
| E 84 Surface Burning Characteristics | Micromat/SSA | ≤25/50 Flame/Smoke | Pass |
| E 84 Surface Burning Characteristics | Tuf-Glas/SSA | ≤25/50 Flame/Smoke | Pass |
| Thermal Resistance | Not tested - adhesive has no influence | NA | NA |
| Water Vapor Permeance | Not Applicable to adhesive coatings | NA | NA |

| Additional Testing | Material | Requirement/Allowable | Status |
|---|---|---|---|
| C 665 Corrosiveness 95% RH, 120 F., 96 hrs. | Galvanized Steel/Tuf-Glas | No corrosion > control material | Pass |
| C 665 Corrosiveness 95% RH, 120 F., 96 hrs. | Galvanized Steel/Micromat | No corrosion > control material | Pass |
| C 665 Corrosiveness 95% RH, 120 F., 96 hrs. | Galvanized Steel/Duracore | No corrosion > control material | Pass |
| C 1617 Accelerated Corrosiveness | Carbon Steel/Tuf-Glas | No corrosion > control material | Pass |

Turning now to the figures, FIG. 1 is a perspective view of an embodiment of an insulation product 10 (or other product). As illustrated, the insulation product 10 is fibrous insulation 12 (e.g., insulation blanket made from fiberglass). The fibrous insulation 12 has a length L, a width W, and a thickness H. The fibrous insulation 12 also includes a first major surface 14 and a second major surface 16, which typically extends for the length and width of the fibrous insulation 12. In some embodiments, a facer 18 may couple to the first major surface 14, the second major surface 16, and/or any other surface of the insulation product 10. As explained above, the fibrous insulation 12 uses a starch-based adhesive to couple to an object. The starch-based adhesive is applied to the first and/or second major surface 14, 16 to form a coating, film, or layer of adhesive. For example, the starch-based adhesive (or other adhesive) may be placed on the first major surface 14 in order to couple a facer 18 to the fibrous insulation 12. In some embodiments, the second major surface 16 may also be coated with the starch-based adhesive enabling the fibrous insulation 12 to couple to an object (e.g., HVAC component, pipe, duct, etc.). In other embodiments, the insulation product 10 may not include a facer 18 but instead starch-based adhesive on the first and/or second surfaces 14, 16. At the time of use, the starch-based adhesive is reactivated with liquid water and adhered to the surface of an object. As the starch-based adhesive dries, the starch-based adhesive couples to the insulation product 10 to the surface and/or object.

Figure 2:
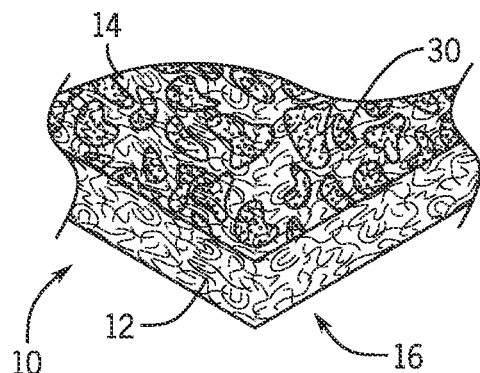
FIG. 2 is a perspective view of an embodiment of an insulation product with an adhesive coating on a major surface.

FIG. 2 is a perspective view of an embodiment of an insulation product 10 with a starch-based adhesive coating 30. As illustrated in FIGS. 2-6, the starch-based adhesive coating 30 may be applied to the surfaces 14, 16 so as to form a non-continuous and/or non-uniform coating, film, or layer on the insulation product 10. The description of "non-continuous" means that the coating, layer, or film is not a single or solid (i.e., essentially unbroken) coating, layer, or film. The description of "non-uniform" means that the pattern of the coating, layer, or film is random. A potential advantage of a non-continuous and/or non-uniform coating, layer, or film is that less starch-based adhesive material is used while providing sufficient adhesion or bonding to a surface. In other embodiments, a continuous and/or uniform coating, layer, or film of the starch-based adhesive may be applied to the insulation product 10 as desired. In some embodiments, the adhesive film, layer, or coating may be about 0.010 to 0.020 inches thick. In still other embodiments, the starch-based adhesive coating may be applied to the insulation product 10 with a coating weight of between 1-6 grams per square foot, 2-4 grams per square foot, 3-4 grams per square foot, etc. These small amounts of adhesive coating on the insulation product enable rapid reactivation and bonding while reducing costs and providing sufficient support for the insulation product 10.

Figure 3:
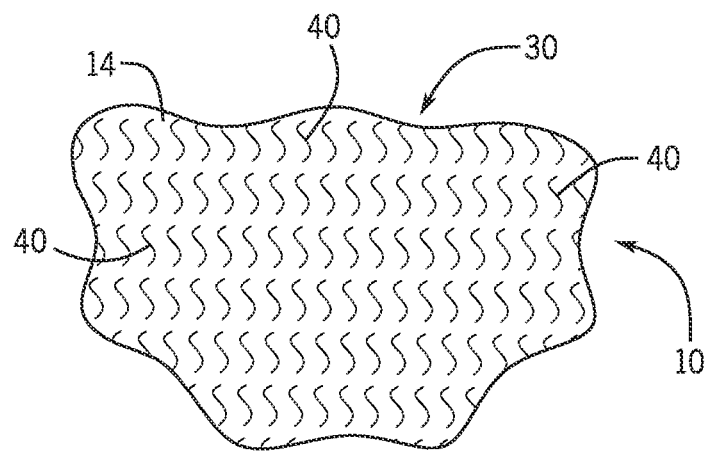
FIG. 3 is a top view of an embodiment of an insulation product with an adhesive coating.
Figure 4:
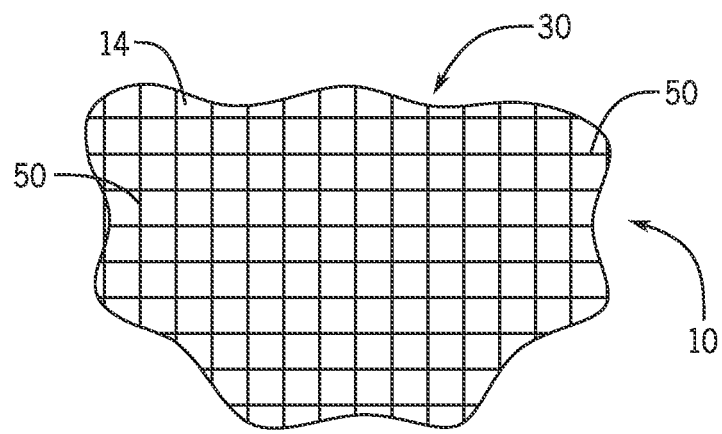
FIG. 4 is a top view of an embodiment of an insulation product with an adhesive coating.
Figure 5:
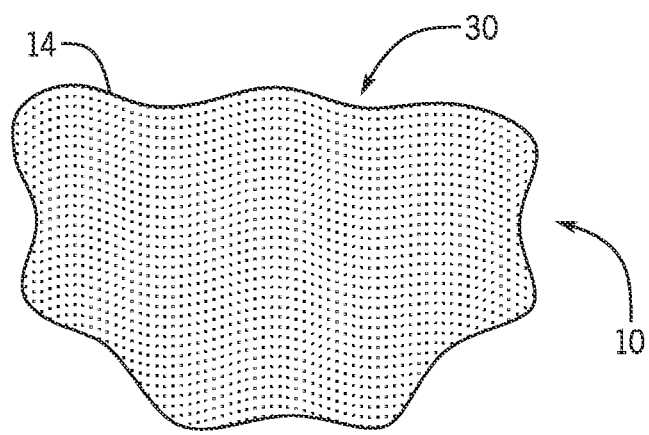
FIG. 5 is a top view of an embodiment of an insulation product with an adhesive coating.

In FIG. 3, the starch-based adhesive coating 30 may be applied to the insulation product 10 with a plurality of way lines 40 (e.g., an S-shaped pattern). In FIG. 4, the starch-based adhesive coating 30 may be applied in a series of parallel and/or crisscrossing straight lines 50. And in FIG. 5, the starch-based adhesive coating 30 may be applied in a repeating dot pattern, or in some embodiments an irregular splat pattern. In still other embodiments, the starch-based adhesive coating 30 may be applied in other patterns such as honeycomb. By not completely covering the surfaces 14, 16 less of the starch-based adhesive may be used while still enabling the insulation product 10 to adhere to the surface of an object.

Figure 6:
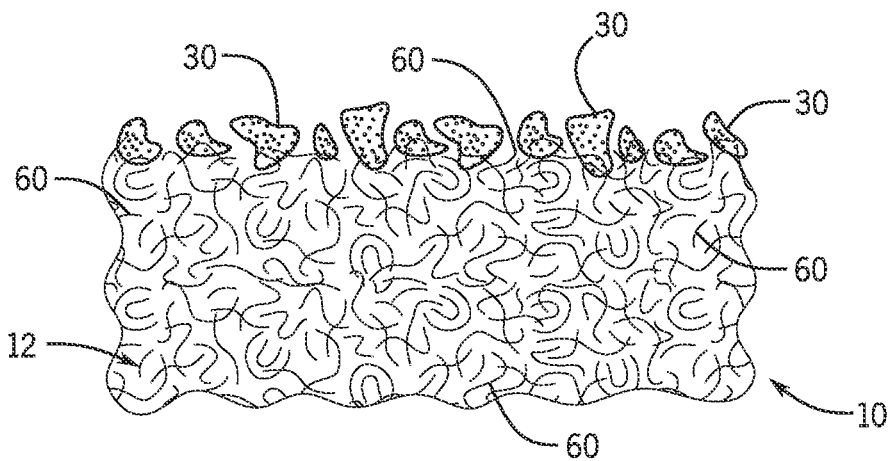
FIG. 6 is a cross-sectional view of an embodiment of an insulation product with an adhesive coating.

FIG. 6 is a cross-sectional view of an embodiment of an insulation product 10. As illustrated, the starch-based adhesive layer 30 couples to the fibers 60 (e.g., fiberglass). The starch-based adhesive layer 30 may adhere to the insulation product 10 through adhesion to the actual fibers 60 and/or by adhering to itself around the fibers 60 (e.g., wrapping at least partially around the fibers 60).

Figure 7:
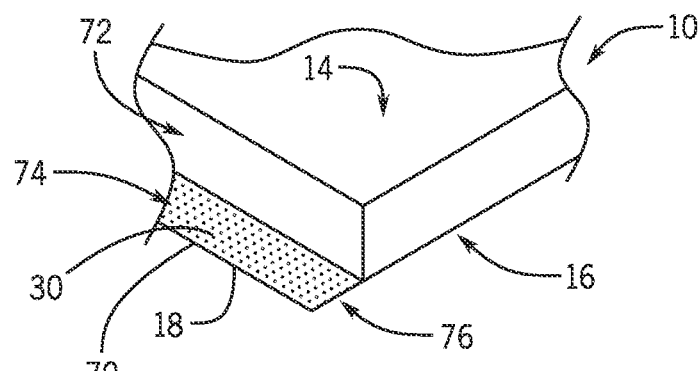
FIG. 7 is a perspective bottom view of an embodiment of an insulation product with a facer.

FIG. 7 is a bottom view of an embodiment of an insulation product 10 with a facer 18. The insulation product 10 may be similar to any of the insulation products described herein (e.g., fibrous insulation, board, etc.). However, the insulation product 10 includes a facer 18 that is wider than the width of the insulation product 10 to form a flange 70 on a side 72 of the insulation product 10. While not shown, the insulation product 10 may include one or more additional flanges 70 on other sides of the insulation product 10. For example, the insulation product 10 may include four flanges 70 one for each side of a square or rectangular insulation product 10. Differently shaped insulation products 10 may include different numbers of flanges 70 (e.g., 1, 2, 3, 4, 5, 6, etc.). In some embodiments, the flanges 70 may extend from the insulation product 10 by 0.5, 1, 1.5, 2, 2.5, 3, or more inches and/or other increment of length.

The starch-based adhesive material 30 described herein may be applied to first and/or second sides 74, 76 so that one or both sides of the flanges 70 include a layer, coating, or film of the starch-based adhesive material 30. This allows the flange 70 to be wetted and pressed against an object surface to adhere or bond the insulation product 10 to the object. In some embodiments, the second major surface 16 may also be coated or layered with the starch-based adhesive 30 to allow these portions of the insulation product 10 to also adhere or bond with an object's surface. In some embodiments, the entire surface on the side 74 of the facer 18, or a substantial portion thereof, may be coated with the starch-based adhesive 30 prior to coupling the facer 18 to the insulation product 10. The starch-based adhesive 30 may bond the facer 18 to the insulation product 10 in addition to providing the flange 70 that is adherable or bondable to other objects.

Figure 8:
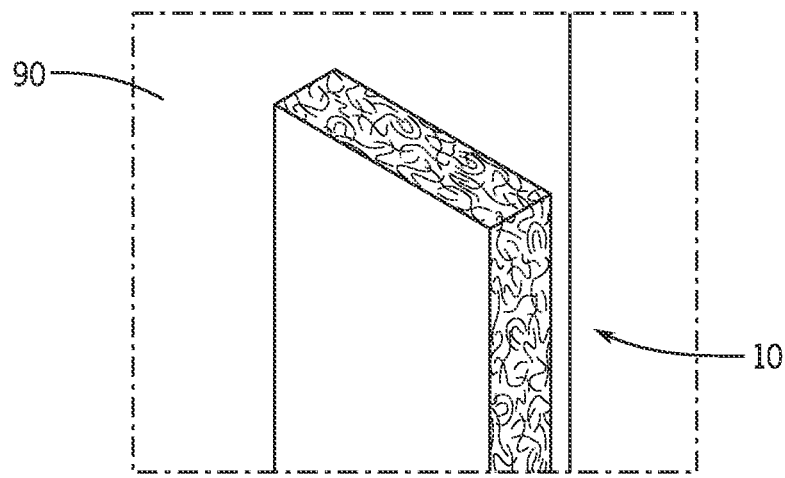
FIG. 8 is a perspective view of an embodiment of an insulation product coupled to an object.

FIG. 8 is a perspective view of an embodiment of an insulation product 10 coupled to an object 90, such as a surface of a duct. As explained above, the insulation product 10 is bonded or adhered to a surface of the object 90 by wetting the dry adhesive layer, coating, or film 30 with liquid water and then placing the insulation product 10 against the object 90 for a period of time (e.g., 1-10 seconds). After the period of time, the starch-based adhesive 30 bonds the insulation product 10 to the surface of the object. In many embodiments, no other fastening mechanism is needed to help support and/or maintain the insulation product 10 against the object 90.

Figure 9:
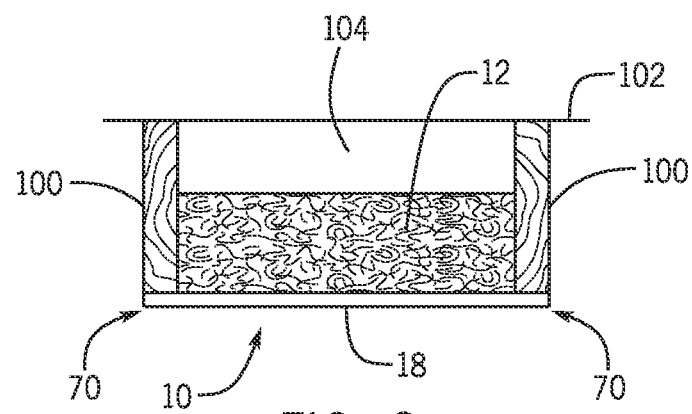
FIG. 9 is a cross-sectional view of an embodiment of an insulation product coupled to an object.

FIG. 9 illustrates an insulation product 10 bonded or adhered between studs or joists 100 of a wall 102, ceiling, or floor. The insulation product 10 includes a facer 18 that may adhere to the studs 100 via the starch-based adhesive coating, layer, or film of the flanges 70. Specifically, liquid water may be applied to the flanges 70 so that the flange's starch-based adhesive coating forms a gel or viscous fluid that adheres the flanges 70 to the studs 100 and/or inner stud walls. In some embodiments, the sides and/or a top surface of the insulation product 10 may include an adhesive coating and may also adhere the insulation product 10 to the studs 100 and/or wall. In some embodiments, the studs 100 may be deeper than the insulation product 10 so that a cavity 104 is formed between a top surface of the insulation product 10 and the wall 102. The insulation product 10 may be pushed between the studs 100 to reduce or eliminate the cavity 104. In some embodiments, the insulation product 10 may be also supported within the cavity 104 using friction, a wall board, a clip and/or other fastener, etc., although oftentimes such additional support mechanisms are not necessary or utilized.

The starch-based adhesive allows the insulation product 10 to be coupled between the studs 100 without the use of clips, pins, staples, and the like. When the insulation product 10 is used in a crawl space or a ceiling, the starch-based adhesive may couple the insulation product 10 between joists 100 without using a lightning rod, which is typically used to hold the insulation product 10 in place. The starch-based adhesive greatly simplifies installation because an installer may simply wet the flanges 70, and/or side or top surface, let the starch-based adhesive tack up for a few seconds, and then crawl underneath the joists 100, and press the insulation product 10 in position. The starch-based adhesive will then set up and hold the insulation product 10 in position. The starch-based adhesive offers a similar advantage in coupling insulation products to steel studs, ducts, pipes, etc.

In some embodiments, the starch-based adhesive may be produced by mixing polystyrene-maleic anhydride (SMA) and/or polyacrylic acid (PAA), an alcohol amine, a polyvinyl alcohol, a starch paste, and water to form an adhesive mixture. In some embodiments, the adhesive mixture may also include aqueous ammonia and/or urea. In some embodiments, the PAA, SMA, and/or SMAc may make up about 1-15% (commonly between about 5-15% or more commonly between about 5-10%) by total weight of the adhesive mixture. The alcohol amine component of the adhesive mixture may be present in the amount of between about 1 and 8% (more commonly between about 1-4%) by total weight of the adhesive mixture. The polyvinyl alcohol may make up about 30-50% (commonly between about 35-45%) by total weight of the adhesive mixture. The starch paste may make up between about 20-40% by total weight of the adhesive mixture, more commonly between about 25-35%. Water may make up the remaining portion of the adhesive mixture, oftentimes in an amount of about 5-50%, more commonly about 5-20%. In embodiments, containing aqueous ammonia, the aqueous ammonia may be present in an amount of about 1-5% by total weight of the adhesive mixture. In embodiments including urea, the urea may be included in an amount of about 1-5% of the total weight of the adhesive mixture. The components may be combined together and then mixed, such as by using a paddle mixer, to form the starch-based adhesive mixture. Once mixed, the starch-based adhesive mixture may be stored until being applied to a piece of insulation or other product. In some embodiments, the starch-based adhesive may be stored between about 60 and 70° F., which maintains the starch-based adhesive at a proper viscosity for application to insulation products.

In some embodiments, all of the ingredients may be combined at once. In other embodiments, the starch paste may be mixed with an existing base adhesive. For example, a base adhesive may include polystyrene-maleic anhydride (SMA) and/or polyacrylic acid (PAA) (such as between about 5-15% by weight of the base adhesive), an alcohol amine (such as between 1-5% by weight of the base adhesive), a polyvinyl alcohol (such as between about 40-60% by weight of the base adhesive), and water (such as between about 10-30% by weight of the base adhesive). In some embodiments, the base adhesive mixture may also include aqueous ammonia (such as between about 1-5% by weight of the base adhesive) and/or urea (such as between about 1-10% by weight of the base adhesive). A starch paste, such as a starch paste having between about 20-40% solids may be mixed with the base adhesive to form the starch-based adhesive, with the starch paste making up between about 20-40% of the starch-based adhesive.

Figure 10:
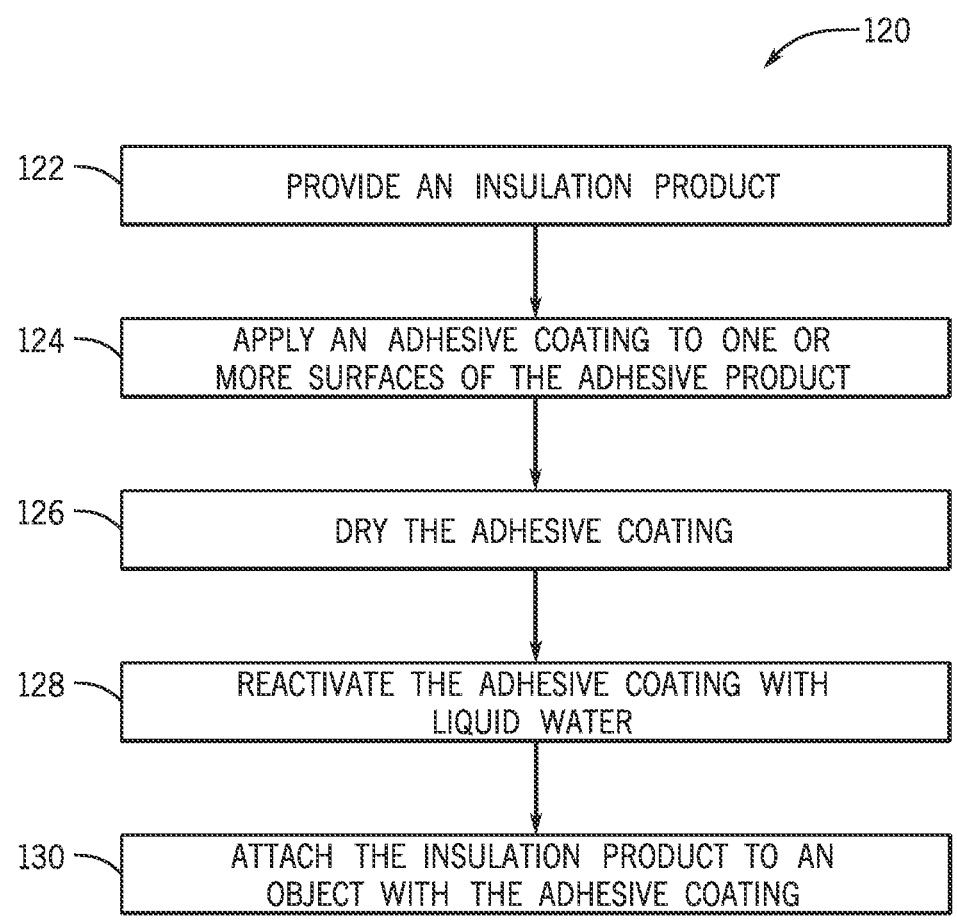
FIG. 10 is a flowchart of a method of making a self-stick insulation product.

Referring now to FIG. 10, illustrated is a flowchart illustrating a process 120 of making an insulation product and attaching the insulation product to an object. At block 122, an insulation product is provided. As described herein, the insulation product has a length, a width, a thickness, and a first major surface and a second major surface which each extend for the length and width of the insulation product. At block 124, a starch-based adhesive is applied to one or more surfaces of the insulation product, such as by spraying, dripping, rolling, and/or otherwise applying the starch-based adhesive, oftentimes in a controlled manner at a desired thickness and/or coating weight. In some embodiments, the starch-based adhesive may be similar to those described herein. As explained above, the starch-based adhesive may be applied to the insulation product using any number of patterns (e.g., wavy lines, straight lines, crisscrossing lines, orthogonal lines, honeycomb pattern, a dot pattern, a splat pattern). At block 126, the starch-based adhesive coating is dried (e.g., air dried, passed through an oven, etc.) to evaporate the water in the adhesive so that the adhesive coating forms a dry layer on the insulation product. In a dried state, the starch-based adhesive may not adhere or bond with another object. In order to reactivate the starch-based adhesive for bonding, liquid water is applied to the starch-based adhesive coating at block 128. This may be done by spraying, rolling, dabbing with a sponge, and/or otherwise applying water to the dried starch-based adhesive and/or surface on which the starch-based adhesive is to be adhered. As just one example, water may be applied to the starch-based adhesive and/or sheet metal and the adhesive can be pressed against the metal to adhere the insulation product to the sheet metal, such as on a coil line for constructing insulated ductwork. The insulation product and starch-based adhesive may be pressed against the surface for a period (oftentimes between about 2-5 seconds) to adhere the starch-based adhesive to the surface. After reactivation of the starch-based adhesive coating, the insulation product may then be bonded to an object (e.g., wood, metal, plastic, etc.), block 130.

In some embodiments, the dry layer of starch-based adhesive may comprise between 0.1% and 10% of the fibrous insulation blanket by weight, although a range of between 2% and 8% is more common. In other embodiments, the dry layer of starch-based adhesive may comprise between 1% and 6%, between 3% and 5%, or about 3% to 4% of the fibrous insulation product by weight. In some embodiments, the amount of starch-based adhesive applied may depend on the application process. For example, continuous or relatively continuous starch-based adhesive coatings may have a dry layer of 8% or 10% by weight of the blanket while an S pattern application could comprise less than 2% by weight of the blanket. In still other embodiments, the dry starch-based adhesive coating may be applied to an insulation product with a coating weight of between 1-6 grams per square foot, 2-4 grams per square foot, 3-4 grams per square foot, etc. In some embodiments, the dry starch-based adhesive layer may become re-adherable or rebondable to other objects upon application of water between about 1% and 15%, 5% and 25%, or about 10% by weight of the insulation product. In some embodiments, upon the subsequent application of water, the adhesive may have a tacky or working state that allows the fibrous insulation product to be repositioned with respect to an object that the starch-based adhesive is applied to. The starch-based adhesive may be in the tacky or working state between 1 second and 30 seconds, after the application of liquid water.

The starch-based adhesive may change to the tacky or working state within 10 seconds, within 5 seconds, and the like upon the application of water. Once the starch-based adhesive dries, the starch-based adhesive may remain non-adherable or nonbondable to other surfaces even when subjected to a relative humidity of up to 100%.

EXAMPLE

An experiment was performed that tested the ability of starch-based adhesives to adhere to two different types of insulation, as well as the adhesives' ability to adhere to galvanized sheet metal surfaces. Each of the adhesives tested included an amount of starch pasted mixed with a base adhesive containing 10.98% by weight of a styrene maleic anhydride copolymer, 3.46% of triethanolamine, 2.78% of aqueous ammonia (~29% solids), 17.44% water, 60% aqueous polyvinyl alcohol, and 5.34% urea. The first of the starch-based adhesives was manufactured in accordance with the present disclosure and utilized a starch paste (SEALMASTER® P30L starch paste from Grain Processing Corporation) having about 30% by weight starch mixture (solids including starch) and about 70% by weight water. A second of the starch-based adhesives utilized a starch paste having about 50% by weight starch mixture (solids including starch) and about 50% by weight water. Each adhesive was applied to two insulation products, a Johns Manville Micromat® (a flexible, resilient, blanket-type fiberglass insulation faced on one side with a smooth, durable, nonwoven glass mat designed for HVAC equipment applications) and a Johns Manville Linacoustic® RC (a duct liner). Results of the ability of each of the adhesives to adhere to the insulation products are shown in Table 4 below.

TABLE 4

| Test Mixture | % Base Adhesive | Starch Additive | % Starch Additive | *Applied Coat Wt. (gr/ft$^2$) | Tack. Time, sec | Adhesion Bond Strength Micromat | Adhesion Bond Strength Linacoustic RC | Humidity Resistance |
|---|---|---|---|---|---|---|---|---|
| 1 | 95 | 30% Solids | 5 | 4 | 6-10 | Good | Good | Good |
| 2 | 90 | 30% Solids | 10 | 4 | 6-10 | Good | Good | Good |
| 3 | 85 | 30% Solids | 15 | 4 | 5-9 | Good | Good | Good |
| 4 | 80 | 30% Solids | 20 | 4 | 4-8 | Good | Good | Good |
| 5 | 75 | 30% Solids | 25 | 4 | 3-7 | Good | Good | Good |
| 6 | 70 | 30% Solids | 30 | 4 | 2-5 | Good | Good | Good |
| 7 | 65 | 30% Solids | 35 | 4 | 2-5 | Good | Good | Marginal |
| 8 | 60 | 30% Solids | 40 | 4 | 2-5 | Good | Good | Poor |
| 9 | 95 | 50% Solids | 5 | 4 | 6-10 | Good | Good | Good |
| 10 | 90 | 50% Solids | 10 | 4 | 6-10 | Good | Good | Good |
| 11 | 85 | 50% Solids | 15 | 4 | 5-9 | Good | Good | Marginal |
| 12 | 80 | 50% Solids | 20 | 4 | 5-9 | Good | Good | Marginal |
| 13 | 75 | 50% Solids | 25 | 4 | 4-8 | Good | Good | Poor |
| 14 | 70 | 50% Solids | 30 | 4 | 4-8 | Good | Good | Poor |
| 15 | 65 | 50% Solids | 35 | 4 | 3-7 | Good | Good | Poor |
| 16 | 60 | 50% Solids | 40 | 4 | 2-5 | Good | Good | Poor |

*Dried adhesive coating on insulation surface

These results demonstrate that a 30% addition of the starch paste to the base adhesive improved tack time significantly over just the base adhesive while still providing good dry adhesion and acceptable humidity resistance. The formulation of the adhesive mixture containing 30% addition of starch paste included approximately 7.69% by weight of a styrene maleic anhydride copolymer, 2.42% of triethanolamine (99% 2,2',2"-nitrilotriethanol, 1% 2,2'-iminodiethanol), 1.94% of aqueous ammonia (~29% solids), 12.21% water, 42% aqueous polyvinyl alcohol, 3.74% urea, and 30% of starch paste.

To further evaluate the effectiveness of the adhesive mixture containing 30% starch paste, the adhesive was roll coated onto several rolls of Micromat and Linacoustic RC insulation using a Black Brothers adhesive roll coater. Samples of the coated insulation material were sent to select HVAC sheet metal shops for evaluation on coil lines and with Roto Bonding equipment. All of the shops were able to successfully re-wet the adhesive coating on the insulation and to apply the insulation material to galvanized sheet metal surfaces. Tack up time was estimated to be between about 2-5 seconds depending on temperature and humidity. These results verify that the improved adhesive mixtures described herein provide tack time improvements to existing re-wettable adhesive mixtures, especially when applied to galvanized sheet metal.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A self-stick insulation, comprising:
   an insulation product; and
   an adhesive coating applied to a major surface of the insulation product, the adhesive coating comprising:
      between about 15 and 30% by weight solids of the adhesive coating of at least one of polystyrene-maleic anhydride (SMA) and polyacrylic acid (PAA);
      between about 1 and 15% by weight solids of the adhesive coating of an alcohol amine;
      between about 25 and 50% by weight solids of the adhesive coating of a polyvinyl alcohol; and
      between about 20 and 30% by weight solids of the adhesive coating of starch paste solids, wherein the adhesive coating is activated with an application of liquid water; and
   wherein the starch paste and the polyvinyl alcohol account for over 70% by weight of a total weight of the adhesive coating.

2. The self-stick insulation of claim 1, wherein:
   the alcohol amine comprises one or more of monoethanolamine (MEA), diethanolamine (DEA), triethanolamine (TEOA), or triethylamine (TEA).

3. The self-stick insulation of claim 1, wherein the starch paste and the polyvinyl alcohol account for between 70% and 80% by weight of the total weight of the adhesive coating.

4. The self-stick insulation of claim 1, wherein a pH of the adhesive coating is 5.5-7.5.

5. The self-stick insulation of claim 1, wherein the adhesive coating comprises a non-continuous and non-uniform coating atop the major surface.

6. The self-stick insulation of claim 1, wherein:
   the adhesive coating is applied to the major surface of the insulation product with a coating weight of between about 1 and 6 grams per square foot.

7. The self-stick insulation of claim 1, wherein:
   the adhesive coating further comprises one or both of urea or ammonia.

8. A re-wettable adhesive mixture, comprising:
   between about 5-15% by weight of a total weight of the adhesive mixture of at least one of polystyrene-maleic anhydride (SMA) and polyacrylic acid (PAA);
   between about 1 and 8% by weight of the total weight of the adhesive mixture of an alcohol amine;
   between about 30 and 60% by weight of the total weight of the adhesive mixture of a polyvinyl alcohol; and
   between about 20 and 40% by weight of the total weight of the adhesive mixture of starch paste, the starch paste having from 20% to 40% solids,
   wherein the adhesive is activated with an application of liquid water; and
   wherein the starch paste and the polyvinyl alcohol account for over 70% of the total weight of the adhesive mixture.

9. The re-wettable adhesive mixture of claim 8, further comprising:
   an aqueous ammonia solution, wherein ammonia in the aqueous ammonia solution makes up between about 1 and 5% by weight of the total weight of the adhesive coating.

10. The re-wettable adhesive mixture of claim 8, wherein:
    the starch paste comprises between about 25 and 40% starch solids and between about 60 and 75% water.

11. The re-wettable adhesive mixture of claim 9, wherein:
    the starch paste further comprises a mold inhibitor.

12. The re-wettable adhesive mixture of claim 8, wherein:
    a pH of the starch paste is between about 3.7 and 4.7.

13. The re-wettable adhesive mixture of claim 8, further comprising:
    between about 1 and 8% by weight of the total weight of the adhesive mixture of one or more of carbamide or carbamidic acid.

14. The re-wettable adhesive mixture of claim 8, further comprising:
    between about 1 and 5% by weight of the total weight of the adhesive mixture of ammonia.

15. A method of making a self-stick insulation, comprising:
    providing a piece of insulation product;
    applying a water-activated adhesive mixture to a surface of the insulation product, the water-activated adhesive mixture comprising:
       between about 5-15% by weight of a total weight of the adhesive mixture of at least one of polystyrene-maleic anhydride (SMA) and polyacrylic acid (PAA);

between about 1 and 8% by weight of the total weight of the adhesive mixture of an alcohol amine;

between about 30 and 60% by weight of the total weight of the adhesive mixture of a polyvinyl alcohol; and between about 20 and 40% by weight of the total weight of the adhesive mixture of a starch paste;

wherein the starch paste and the polyvinyl alcohol account for over 70% of the total weight of the adhesive mixture; and drying the water-activated adhesive mixture to evaporate the water to form a dry adhesive coating layer on the surface.

16. The method of making of self-stick insulation of claim 15, wherein:

applying the water-activated adhesive mixture comprises one or both of spraying or rolling the water-activated adhesive coating onto the surface of the insulation product.

17. The method of making of self-stick insulation of claim 15, wherein:

the water-activated adhesive mixture is applied to the surface of the insulation product with a coating weight of between about 1 and 6 grams per square foot.

18. The method of making of self-stick insulation of claim 15, further comprising:

applying water to one or both of the dry adhesive coating layer or a surface of an object; and pressing the insulation product against the surface of the object to adhere the insulation product to the object.

19. The method of making of self-stick insulation of claim 15, wherein:

the dry adhesive coating layer is present in an amount of between 0.1 and 10% of the insulation product by weight.

20. The method of making of self-stick insulation of claim 15, wherein:

drying the water-activated adhesive mixture comprises passing the insulation product having the water-activated adhesive mixture applied to the surface through an oven.

* * * * *